May 22, 1962     L. R. HULLS     3,036,266

ELECTROMECHANICAL TRANSDUCER

Filed Nov. 3, 1958

INVENTOR
Leonard R. Hulls

United States Patent Office 3,036,266
Patented May 22, 1962

3,036,266
ELECTROMECHANICAL TRANSDUCER
Leonard R. Hulls, Dundas, Ontario, Canada, assignor to Canadian Westinghouse Company, Limited, Hamilton, Ontario, Canada
Filed Nov. 3, 1958, Ser. No. 771,553
11 Claims. (Cl. 324—34)

This invention relates to precision measuring and locating or positioning devices, particularly for measuring the position of tables of machine tools or tool holders of machine tools although it may have application in other areas.

Numerous methods have been suggested in the past for measuring mechanical distances in terms of an electrical quantity. For example, differential transformers which vary the coupling between two coils have been used as distance gauges. The linearity of such devices however is usually limited to a very slight mechanical displacement. To overcome this limitation it would be possible to use a plurality of units closely adjacent and having repetitive form. This permits the accuracy and linearity of a slight mechanical movement together with freedom of a long mechanical motion when it is required. One example of a similar approach to the problem uses an electromagnetic pick-up device which corresponds to a portion of the differential transformer which is mounted adjacent a series of magnetic members which are moved relative to the pick-up member. By precisely spacing and arranging the magnetic members, the pick-up member may be definitely located with respect to any one of the magnetic members. However, in order to precisely position the table at any point other than at points where the pick-up may be opposite the magnetic members, it is necessary actually to position the pick-up directly opposite the magnetic member and then move the pick-up member relative to the machine bed by a micrometer adjustment. Thus the table may be positioned at any point relative to the machine bed while in fact the pick-up may only be positioned accurately directly opposite the magnetic members. While such a system may be satisfactory for some purposes, it introduces a discontinuity in that moving from one magnetic member to the next, the micrometer adjustment must be moved back to zero if it is desired to again position the table exactly opposite a zero point relative to the machine bed.

It is therefore an object of this invention to provide an improved precision measuring or positioning device which may be precisely located with respect to certain fixed points at any of a plurality of positions and which may also be continuously adjusted in between such positions without intervening discontinuity.

It is a further object of this invention to provide an improved precision measuring and locating device which is extremely rugged and simple in construction.

These and other objects as will be apparent from the following specification and drawing are attained by utilizing an elongated cylindrical member of magnetic material having on its surface a spiral path, the path having a different magnetic characteristic relative to that of the main body of the cylinder. Surrounding at least a portion of the cylinder is a head which is free to move over the surface of the cylinder, the head and a pair of poles are magnetically linked by said cylinder. At least one of the poles has at least a partial spiral path on its surface of different magnetic permeability from the main body of the pole and the spiral path on the pole and the cylinder have the same pitch. As the cylinder links the poles, it will be evident that when the surfaces of maximum permeability of the pole and cylinder coincide, the reluctance of the magnetic path through the poles and the body of the head and through the cylinder will be at a minimum, whereas as the head is displaced and the surface of minimum permeability on the pole coincides with the surface of maximum permeability of the cylinder, the reluctance of the path will increase. By this means relative position of the two spirals may be detected by measuring the reluctance of the magnetic path. In order to determine the position of the head at points other than those where the spirals are either directly one over the other or directly offset from one another, the cylinder may be rotated until the spiral paths are directly coincident. This in effect produces a micrometer adjustment. By reproducing this pole system at the other end of the head offset one half pitch, the reluctance of one path reaches the maximum when the reluctance of the other path reaches a minimum. By introducing these two path reluctances into a bridge they may be balanced one against the other until they are equal. This will give a continual null reading on the bridge output only as long as the reluctance of the two paths are equal. If now the cylinder is rotated in effect the spirals are displaced and a null reading will no longer be produced except by a further movement of the head in an axial direction until once more the reluctance of the paths are equal.

A clearer understanding of my invention may be had on consideration of the following specification and drawings, in which.

Figure 1:
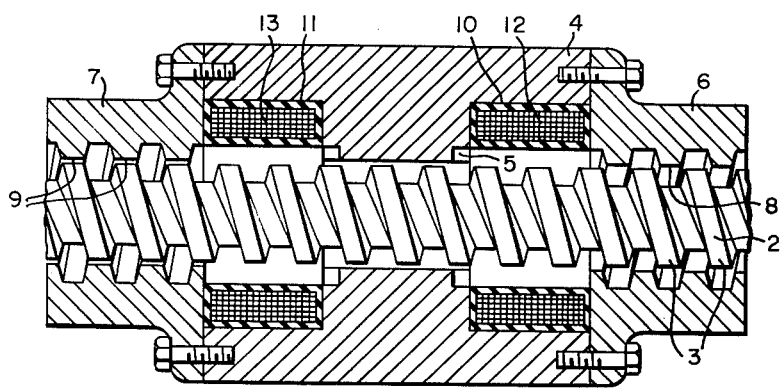
FIGURE 1 is a sectional view of the present transducer device.

In FIGURE 1, there is shown a cylinder 2 which corresponds to an ordinary steel lead screw having cut on its surface a square cut thread with the width of the thread equal to the width between the threads. In effect this leaves a spiral path down the lead screw where the steel has been cut away leaving only air which of course has a lower permeability than the steel. The cylinder may be any length as required and of course preferably extends over the full length of the desired operation of the machine tool or whatever device is being controlled. A section of the cylinder appears castellated due to existence of the lands 3. While not shown it should be understood that this cylinder is supported on the bed of the machine tool in such a position as to permit the proper corelation between the cylinder and the table or machine which is to be located, and also in such a manner as to permit rotational motion of the cylinder with a minimum error due to the displacement of the cylinder. For this purpose both ends of the cylinder are preferably mounted in prestressed ball bearings to eliminate axial motion.

Mounted coaxially with the cylinder is a magnetic head 4 which has a body 5 which surrounds a portion of the cylinder. It does not actually engage the cylinder surface thus permitting the head to be moved axially of the cylinder. At the ends of the head are mounted pole pieces designated 6 and 7. These pole pieces are essentially annular in form and on their inner surfaces coaxial with the cylinder they are patterned in a manner similar to that threading existing on the surface of the cylinder, with a square cut thread leaving lands 8 and 9 which appear as a castellation in cross section. These lands preferably are of the same width as the lands on the cylinder 2 while the pitch of the thread is the same pitch as the pitch of the thread on the cylinder 2. At each end of the head 4 there are annular recesses 10 and 11 in which are mounted annular coils 12 and 13 which are fixed to the head 4 and surround the cylinder 2 but have such an internal diameter as not to interfere with the surface of the cylinder 2. The spacing of the poles 6 and 7 is such that when the lands of one pole are directly opposite the lands of the cylinder 2, the lands of the other pole are directly opposite the grooves of the thread cut in the cylinder. In other words, the spacing is some practically desirable whole number of pitch lengths plus one-half of a pitch length. The whole head assembly is mounted to permit axial motion of the head 4 relative to the cylinder 2 but to prohibit rotational motion of the head relative to the controlled machine and the head is thusly coupled to the table or machine tool or whatever is to be positioned. Since the cylinder is fixed in its axial position, then by positioning the head relative to the cylinder, it is possible to position the machine tool or table relative to the cylinder 2 or in turn to position the head or tool relative to the machine as a whole, as may be desired.

Figure 2:
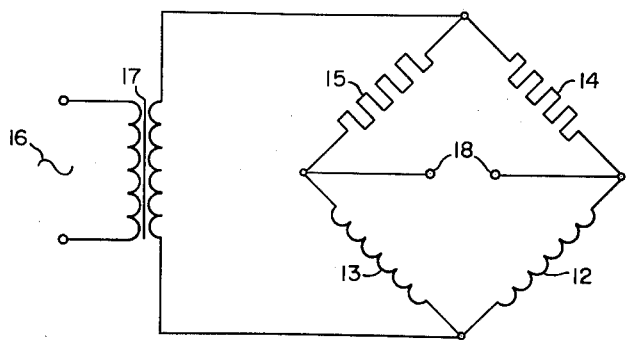
FIG. 2 is a schematic diagram of the associated electrical circuit.

In FIGURE 2, there is shown the necessary electrical circuit for deriving the indicating signal or control signal for such positioning. The annular coils 12 and 13 are shown in FIG. 2 as elements of a bridge circuit. The remaining elements of the bridge are resistors 14 and 15 and an alternating-current supply, for example 60 cycle, is provided from A.C. supply 16 through transformer 17 to two terminals of the bridge namely, the junction of resistors 15 and 14 and the junction of coils 12 and 13. The output from the bridge appears at terminals 18 and we may now consider the operation of the device with the head in the position as shown in FIGURE 1.

In this position the lands 8 are slightly offset with respect to lands 3 while lands 9 are slightly offset with respect to the grooves between the lands 3. As a result, the reluctance of the path including poles 6, lands 8, lands 3, the cylinder and the head 4, is less than the reluctance of the path including lands 9, lands 3, pole 7 and head 4, and the cylinder. As a result if initially, with the reluctance of these respective paths equal, the bridge has been balanced by the selection of resistors 14 and 15 so that there is no output across terminals 18, then with the unbalanced reluctance in the two paths the inductance of one of the coils may be greater, for example, the inductance of coil 12 may be greater than the inductance of coil 13. This causes an unbalance of the bridge and an output signal across terminals 18. The signal across terminals 18 may be applied to any suitable indicator or to a servo mechanism and in either case the head may be adjusted until the inductance of both coils is equal which implies a specific physical relationship between the head 4 and the cylinder 2. This balancing may be produced in two manners—first by axial motion of the head, or second by a rotational motion of the cylinder. It will be appreciated that one complete rotation of the cylinder will be equivalent to a motion of the head one complete screw pitch. On the other hand, a portion of a complete revolution will be equivalent to a portion of a screw pitch of linear motion of the head.

By calibrating the cylinder 2, it is possible to index it for rotation whereby degrees of rotation are designated as linear motion of the head 4; 360° being equal to one thread pitch, 36° being equal to one-tenth of a thread pitch and 3.6° being equal to $\frac{1}{100}$ of a pitch, and so forth. For example, if the thread pitch is $\frac{1}{10}$ of an inch, the distance from the leading edge of one land to the leading edge of the next land is $\frac{1}{10}$ of an inch, then rotation of the cylinder of 36° is equivalent to the linear motion of the head of $\frac{1}{100}$ of an inch and a rotation of the cylinder of 3.6° is equivalent to the linear motion of the head of $\frac{1}{1000}$ of an inch. It is therefore possible to define the position of the head 4 with respect to the cylinder 2 in terms of multiples of a thread pitch and fractions of a thread pitch while at all times it is only necessary to adjust the head 4 for a null output of the bridge. If the transducer is a portion of a servo system, it will be apparent that the output from terminals 18 may be applied either directly or through an amplifier to the terminals of a servo motor and thus to one phase of a two phase servo motor. The other phase of the servo motor is then connected to the A.C. supply and the rate of rotation of the servo motor will be proportional to the amplitude of the bridge output while the direction of rotation of the servo motor will be dependent upon the phase of output from the bridge circuit.

It is of course possible to manually count the number of rotations made by the cylinder or lead screw in positioning the head from a given zero point. Alternatively, it may be more satisfactory to tell or count the number of nulls passed by the transducer head in actually moving along the cylinder from a predetermined zero point. This will give the number of thread pitches of relative motion of the head beyond the zero point. The relative position of the head beyond the zero point may then be expressed as a certain number of inches and to place the head accurately on a predetermined point it is then only necessary to rotate the cylinder to add to this specific number of inches the fractional quantity necessary to suitably position the head, and as previously indicated this fractional quantity will be indicated by proper graduation of the rotating scale on the cylinder. As an example, with a thread pitch of $\frac{1}{10}$ of an inch and a desired position of the head 3.16 inches beyond a zero point, it will be necessary to move the head 31 thread pitches or through 31 nulls beyond the zero point and then rotate the cylinder 21.6 degrees from a zero position.

While the form of the transducer device shown in FIG. 1 operates very satisfactorily with the bridge circuit, it will be appreciated that more simple forms of the transducer device may be constructed which have only one pole piece on the head and merely measure the increase or decrease of reluctance of the path. This will not give such an accurate null value as the form shown, but may be suitable in some applications. In this case the head is moved until a minimum value of reluctance or a maximum value of reluctance is produced and the position of the head relative to the cylinder is derived as previously indicated by the number of maxima or minima the head has passed from the predetermined zero position and the degrees of rotation of the cylinder from its zero position.

The pick-up head 4 as shown introduces certain problems if formed of solid metal and operated at conventional line frequencies, for example 60 c.p.s. A laminated form would, however, require radial directed laminations. This would be difficult to manufacture and so to avoid such problems the head may be formed as shown in FIG. 1 in cross-section but only extending half-way or less around the cylinder. The head may then be built up of flat laminations and the poles shaped to partially surround the cylinder. The head would then appear in section similar to the upper half of the section shown in FIGURE 1 with laminations lying in the plane of the paper. This form of head has particular advantage when the transducer is extremely elongated. The cylinder may then be supported intermediate its ends by means of trough type supports for example. In order to permit the head to traverse the full length of the cylinder without encountering the supports, it is necessary to avoid any portion of the head completely encircling the cylinder. It will be evident, however, that the coil or coils need not surround the cylinder but only surround some portion of the magnetic path consisting of the pole, the head, the cylinder and any air gaps therebetween. The coil may therefore conveniently be moved intermediate the head and the pole if this portion is not annular.

I claim as my invention:

1. An electromechanical transducer comprising a first member of cylindrical form having around its cylindrical surface a first helical path of material having a different magnetic characteristic than the magnetic characteristic of the material from which said first member is formed, a second member at least partially surrounding the cylindrical surface of said first member and in close proximity thereto, with at least one portion of said second member having at least a portion of a second helical path and of material having a different magnetic characteristic than the magnetic characteristic of the material from which said second member is formed, said second helical path having substantially the same pitch as said first helical path, and a magnetic field providing member positioned to be operative with the magnetic surface including said second member having said second helical path, the gaps between said first and second members and at least a portion of said first member.

2. An electromechanical transducer comprising a first member of cylindrical form having around its cylindrical surface a first helical path of material having a different magnetic characteristic than the magnetic characteristic of the material from which said first member is formed, a second member at least partially surrounding the cylindrical surface of said first member and in close proximity thereto, with at least one portion of said second member having at least a portion of a second helical path and of material having a different magnetic characteristic than the magnetic characteristic of the material from which said second member is formed, said second helical path having substantially the same pitch as said first helical path, and magnetic reluctance sensing means positioned to sense the magnetic characteristic of the magnetic circuit including another portion of said second member not including said second helical path and said one portion of said second member having said second helical path, the gaps between said first and second members and at least a portion of said first member, and with at least one of said first and second members being formed from ferromagnetic material.

3. An electromechanical transducer comprising a first member of cylindrical form having around its cylindrical surface a first helical path of material having a different magnetic characteristic than the magnetic characteristic of the material from which said first member is formed, a second member at least partially surrounding the cylindrical surface of said first member and in close proximity thereto, with at least one portion of said second member having at least a portion of a second helical path and of material having a different magnetic characteristic than the magnetic characteristic of the material from which said second member is formed, said second helical path having substantially the same pitch as said first helical path, and magnetic characteristic measurement means positioned to measure the magnetic characteristic of the magnetic circuit including another portion of said second member not including said second helical path and said one portion of said second member having said second helical path, the gaps between said first and second members and at least a portion of said first member, with at least one of said first and second members being formed from ferromagnetic material, and the material of at least one of said first and second helical paths being air.

4. An electromechanical transducer operative with a current supply and comprising a first member of cylindrical form having around its cylindrical surface a first helical path of material having a different magnetic characteristic than the magnetic characteristic of the material from which said first member is formed, a second member at least partially surrounding the cylindrical surface of said first member and in close proximity thereto, with at least one portion of said second member having at least a portion of a second helical path and of material having a different magnetic characteristic than the magnetic characteristic of the material from which said second member is formed, said second helical path having substantially the same pitch as said first helical path, and magnetic field providing means positioned to be operative with the magnetic circuit including another portion of said second member not including said second helical path and said one portion of said second member having said second helical path, the gaps between said first and second members and at least a portion of said first member, with said magnetic field providing means including at least one electrical conductor surrounding a portion of said magnetic circuit and adapted to be operative with said current supply to pass an alternating electric current through said conductor.

5. An electromechanical transducer comprising a first member of cylindrical form having around its cylindrical surface a first helical path of material having a different magnetic characteristic than the magnetic characteristic of the material from which said first member is formed, a second member comprising a head and a pair of poles all of which at least partially surround the cylindrical surface of said first member in close proximity thereto and being arranged in axial alignment with said head interposed between said poles, with one of said poles having at least a portion of a second helical path of material having a different magnetic characteristic than the magnetic characteristic of the material from which the remainder of said one pole is formed and with said second path having the same pitch as said first helical path, and with the other of said poles having at least a portion of a third helical path similar to said second helical path, said second and third helical paths being spaced one from the other a whole number of pitch lengths plus one half of a pitch length, and magnetic characteristic comparison means operative with a first magnetic circuit including said one pole, a first portion of said head, a first portion of said first member and the gaps respectively between said one pole and said first member and between said head and said first member and operative with a second magnetic circuit including said other pole, a second portion of said head, a second portion of said first member and the gaps respectively between said other pole and said first member and between said head and said first member.

6. An electromechanical transducer comprising a first member of cylindrical form having around its cylindrical surface a first helical path of material having a different magnetic characteristic than the magnetic characteristic of the material from which said first member is formed, a second member comprising a head and a pair of poles all of which at least partially surround the cylindrical surface of said first member in close proximity thereto and being arranged in axial alignment with said head interposed between said poles, with one of said poles having at least a portion of a second helical path of material having a different magnetic characteristic than the magnetic characteristic of the material from which the remainder of said one pole is formed and with said second path having the same pitch as said first helical path, and with the other of said poles having at least a portion of a third helical path similar to said second helical path, said second and third helical paths being spaced one from the other a whole number of pitch lengths plus one half of a pitch length, and magnetic comparison means operative to compare the magnetic characteristic of a first magnetic circuit including said one pole, a first portion of said head, a first portion of said first member and the gaps respectively between said one pole and said first member and between said head and said first member with the magnetic characteristic of a second magnetic circuit including said other pole, a second portion of said head, a second portion of said first member and the gaps respectively between said other pole and said first member and between said head and said first member, with at least one of said second and third helical paths comprising air.

7. An electromechanical transducer comprising a first member of cylindrical form having around its cylindrical surface a first helical path of material having a different magnetic characteristic than the magnetic characteristic of the material from which said first member is formed, a second member comprising a head and a pair of poles all of which at least partially surround the cylindrical surface of said first member in close proximity thereto and being arranged in axial alignment with said head interposed between said poles, with one of said poles having at least a portion of a second helical path of material having a different magnetic characteristic than the magnetic characteristic of the material from which the remainder of said one pole is formed and with said second path having the same pitch as said first helical path, and with the other of said poles having at least a portion of a third helical path similar to said second helical path, said second and third helical paths being spaced one from the other a whole number of pitch lengths plus one half of a pitch length, and magnetic comparison means operative to compare the magnetic characteristic of a first magnetic circuit including said one pole, a first portion of said head, a first portion of said first member and the gaps respectively between said one pole and said first member and between said head and said first member with the magnetic characteristic of a second magnetic circuit including said other pole, a second portion of said head, a second portion of said first member and the gaps respectively between said other pole and said first member and between said head and said first member, with at least one of said first and second members being formed from ferromagnetic material.

8. An electromechanical transducer comprising a first member of cylindrical form having around its cylindrical surface a first helical path of material having a different magnetic characteristic than the magnetic characteristic of the material from which said first member is formed, a second member comprising a head and a pair of poles all of which at least partially surround the cylindrical surface of said first member in close proximity thereto and being arranged in axial alignment with said head interposed between said poles, with one of said poles having at least a portion of a second helical path of material having a different magnetic characteristic than the magnetic characteristic of the material from which the remainder of said one pole is formed and with said second path having the same pitch as said first helical path, and with the other of said poles having at least a portion of a third helical path similar to said second helical path, said second and third helical paths being spaced one from the other a whole number of pitch lengths plus one half of a pitch length, and magnetic field providing comparison means operative to compare the magnetic characteristic of a first magnetic circuit including said one pole, a first portion of said head, a first portion of said first member and the gaps respectively between said one pole and said first member and between said head and said first member with the magnetic characteristic of a second magnetic circuit including said other pole, a second portion of said head, a second portion of said first member and the gaps respectively between said other pole and said first member and between said head and said first member, with at least one of said first and second helical paths comprising air.

9. An electromechanical transducer operative with a current supply and comprising a first member of cylindrical form having around its cylindrical surface a first helical path of material having a different magnetic characteristic than the magnetic characteristic of the material from which said first member is formed, a second member comprising a head and a pair of poles all of which at least partially surround the cylindrical surface of said first member in close proximity thereto and being arranged in axial alignment with said head interposed between said poles, with one of said poles having at least a portion of a second helical path of material having a different magnetic characteristic than the magnetic characteristic of the material from which the remainder of said one pole is formed and with said second path having the same pitch as said first helical path, and with the other of said poles having at least a portion of a third helical path similar to said second helical path, said second and third helical paths being spaced one from the other a whole number of pitch lengths plus one half of a pitch length, and magnetic field reluctance comparison means operative to compare the magnetic field reluctance characteristic of a first magnetic circuit including said one pole, a first portion of said head, a first portion of said first member and the gaps respectively between said one pole and said first member and between said head and said first member with the magnetic field reluctance characteristic of a second magnetic circuit including said other pole, a second portion of said head, a second portion of said first member and the gaps respectively between said other pole and said first member and between said head and said first member, with said latter means operative to compare the magnetic characteristics of said first and second magnetic circuits including at least one electrical conductor surrounding a portion of each of said magnetic circuits and adapted for connection to said current supply to pass an alternating current therethrough.

10. An electromechanical transducer comprising a first member of cylindrical form having around its cylindrical surface a first helical path, a second member comprising a head and a pair of poles all of which at least partially surround the cylindrical surface of said first member in close proximity thereto and being arranged in axial alignment with said head interposed between said poles, with one of said poles having at least a portion of a second helical path and with said second path having the same pitch as said first helical path, and with the other of said poles having at least a portion of a third helical path similar to said second helical path, said second and third helical paths being spaced one from the other a whole number of pitch lengths plus one half of a pitch length, and magnetic characteristic comparison means operative with a first magnetic circuit including said one pole, a first portion of said head, a first portion of said first member and the gaps respectively between said one pole and said first member and between said head and said first member and operative with a second magnetic circuit including said other pole, a second portion of said head, a second portion of said first member and the gaps respectively between said other pole and said first member and between said head and said first member.

11. An electromechanical transducer comprising a first member of cylindrical form having around its cylindrical surface a first helical path, a second member at least partially surrounding the cylindrical surface of said first member and in close proximity thereto, with at least one portion of said second member having at least a portion of a second helical path, said second helical path having substantially the same pitch as said first helical path, and magnetic reluctance sensing means positioned to sense the magnetic characteristic of the magnetic circuit including another portion of said second member not including said second helical path and said one portion of said second member having said second helical path, the gaps between said first and second members and at least a portion of said first member, and with at least one of said first and second members being formed from ferromagnetic material.

References Cited in the file of this patent

UNITED STATES PATENTS

| | | |
|---|---|---|
| 2,230,945 | Hansell | Feb. 4, 1941 |
| 2,430,757 | Conrad et al. | Nov. 11, 1947 |
| 2,611,964 | Buisson | Sept. 30, 1952 |

Notice of Adverse Decision in Interference

In Interference No. 93,276 involving Patent No. 3,036,266, L. R. Hulls, Electromechanical transducer, final decision adverse to the patentee was rendered Oct. 8, 1963, as to claims 1, 2, 3, 4 and 11.

[*Official Gazette November 12, 1963.*]